(12) United States Patent
Faith et al.

(10) Patent No.: US 8,079,529 B2
(45) Date of Patent: *Dec. 20, 2011

(54) EMF SIGNATURE DEVICE

(75) Inventors: Patrick Faith, Pleasanton, CA (US); Mark Carlson, Half Moon Bay, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/894,843

(22) Filed: Sep. 30, 2010

(65) Prior Publication Data

US 2011/0073640 A1    Mar. 31, 2011

Related U.S. Application Data

(63) Continuation-in-part of application No. 12/854,466, filed on Aug. 11, 2010, now Pat. No. 8,020,764.

(51) Int. Cl.
*G06K 19/00* (2006.01)

(52) U.S. Cl. ........................................ 235/492; 235/487

(58) Field of Classification Search .................. 235/375, 235/380, 451, 487, 492
See application file for complete search history.

(56) References Cited

U.S. PATENT DOCUMENTS

| 6,193,156 | B1 * | 2/2001 | Han et al. | 235/454 |
| 6,769,616 | B2 | 8/2004 | Fu et al. | |
| 7,497,379 | B2 | 3/2009 | Chen et al. | |
| 7,793,837 | B1 * | 9/2010 | Faith et al. | 235/382 |
| 2003/0112118 | A1 | 6/2003 | Raslan | |
| 2006/0267230 | A1 | 11/2006 | Rha et al. | |
| 2008/0149700 | A1 | 6/2008 | Tuyls et al. | |
| 2011/0049233 | A1 * | 3/2011 | Faith et al. | 235/375 |

FOREIGN PATENT DOCUMENTS

WO    WO 02/50790 A1    6/2002

* cited by examiner

*Primary Examiner* — Michael G Lee
*Assistant Examiner* — Matthew Mikels
(74) *Attorney, Agent, or Firm* — Kilpatrick, Townsend & Stockton LLP

(57) ABSTRACT

Systems, methods and devices for making and using EMF signature enabled portable consumer devices are disclosed. EMF signature enabled portable consumer devices, such as credit cards, can include a conductive or semiconductive brittle material layer with an intentionally created random crack or fissure pattern. The intentionally created unique random crack patterns can be created by cost effective and highly scalable standardized processes. When an input signal is applied to the portable consumer device, an EMF signature based on the unique random crack pattern can be induced. The resulting EMF signature can be detected, processed and used as the basis for various encryption, security or authentication protocols.

19 Claims, 9 Drawing Sheets

200A

200B

220C

EMF SIGNATURE DEVICE

CROSS-REFERENCES TO RELATED APPLICATIONS

This application is a continuation-in-part of U.S. Non-Provisional patent application Ser. No. 12/854,466, filed on Aug. 11, 2010, which is a continuation of and claims priority to U.S. Non-Provisional patent application Ser. No. 12/414,165, filed on Mar. 30, 2009, each of which is herein incorporated by reference in their entirety for all purposes.

BACKGROUND

As the variety of methods and devices for engaging in electronic transactions and authorizations increase, problems such as fraud and counterfeiting also increase. One way to reduce such problems is to authenticate the identification devices, or other portable consumer devices, used to initiate electronic transactions or authorizations.

Some contemporary authentication systems, such as anti-fraud and anti-counterfeiting systems, authenticate a portable consumer device using various difficult to reproduce authentication features (i.e. holograms or micro printing). Other systems use various forms of risk analysis, while others rely on information, sometimes included on the portable consumer device itself, to provide or generate protected identifiers or passwords. Such systems often include use of encrypted or dynamic information, such as conventional dynamic card verification values (dCVVs) in credit card systems.

In one exemplary system, at the front-end of the transaction (e.g. where a merchant and a consumer reside), a credit card provides information associated with the portable consumer device or the consumer. The information in such systems include various styles and techniques for producing encrypted information or authentication features. Regardless of the type of encryption or authentication feature used, such anti-fraud or anti-counterfeiting systems have various financial and computational resource costs associated with production and utilization. Various embodiments of the present invention are directed toward reducing such costs while also increasing the reliability and security of encryption and authentication feature based transactions and authentications.

An example of a conventional credit card that can include various encrypted information or authentication features is depicted in FIGS. 1A, 1B and 1C. As shown in FIG. 1A, a conventional credit card 100 typically displays information such account number 110, account holder's name 130 and some type of anti-counterfeiting measure 120. Most current credit and debit cards are made of up of at least two layers. FIG. 1B shows a cross-section of typical credit card stock comprising a substrate layer 150 and a top layer 140.

Substrate layer 150 is usually a semi-rigid plastic that can be stamped or embossed. Top layer 140 is usually a print or decal identifying the issuer of the credit card and possibly other information. In most conventional credit cards, important information such as account number 110 and account holder name 130 are embossed by an embosser 160 and then painted at the apex of the embossed regions 170 to increase legibility as shown in FIG. 1C. Embossing such information serves multiple purposes: 1) embossed information is more durable than simple printing, 2) provided a means for quickly copying such information by taking an imprint of the card and 3) embossed information is more difficult to reproduce or alter and, as such, was one of the first attempts to curb counterfeiting. In addition, credit card 100 may also have a card verification value (CVV) printed on the back of that card that is not included in any computer readable media that might be included on the card. However, improvements to existing anti-counterfeiting technologies are still desirable.

For example, authentication feature or anti-counterfeiting measure 120 can be a sophisticated holographic image, a watermark, micro printed designs or text, or fluorescent details that show up under ultraviolet light. The main idea in conventional physical anti-counterfeiting technology is to include a physical characteristic on the card that is too difficult or costly for counterfeiters to reproduce. However, counterfeiters gradually catch up to each technology in time. When the counterfeiters catch up to a particular anti-counterfeiting measure, that measure becomes obsolete. Because conventional anti-counterfeiting technologies are ultimately rendered obsolete, their continued inclusion in portable consumer devices is usually based on their use as an additional anti-counterfeiting deterrent. To increase overall security, physical security measures are often used in conjunction with various front-end and back-end encryption and computer security techniques.

Using various algorithms and encryption keys, the information provided to an authentication system is protected in an encrypted form as it is transmitted from the front-end of the transaction to a back-end system. The information sent can only be unencrypted by the back-end system when the proper encryption key is used. Due to the critical role the encryption key plays, maintaining the secrecy of the encryption keys is of utmost importance in such systems and often requires sophisticated mathematical schemes to produce unique encryption keys or seed values. Using such schemes to produce large numbers of secure and unique encryption keys can often be costly and difficult to scale.

In addition, some conventional authentication systems require a user to enter a PIN presumably known only to the user to authenticate the user or the portable consumer device. This provides a level of security that helps ensure that the user presenting the portable consumer device is an authorized user of that particular device. The assumption here is that the PIN will only be known by an authorized user and will not be revealed to or discovered by someone wishing to commit fraud. In some such systems, the PIN can be included in or used to complete the encryption key or seed value to further increase the security of the particular encryption scheme used.

Despite the best efforts of users and issuers of portable consumer devices, account numbers, personal identifiers, PINs and encryptions keys can be stolen or discovered and then used by unauthorized parties to replicate portable consumer devices so as to defraud authentication systems. Since data can be hacked and stolen and the sophistication of unauthorized users and counterfeiters continues to increase, it is currently possible to make fraudulent cards that can be used for transactions once key information is known. The fraudulent portable consumer device will appear to be an authentic device since it will have all the correct information and characteristics. An unauthorized user may have even discovered the PIN or other access code to provide when presenting the device for authentication.

It is clear that what is needed is a system, method, and device to prevent unauthorized users from creating and using fraudulent versions of portable consumer devices while also decreasing the cost of production and use. Embodiments of the disclosed invention address these and other problems, individually and collectively.

BRIEF SUMMARY

Embodiments of the present invention are directed toward systems for authenticating portable consumer devices. Such systems include a portable consumer device having a substrate layer, a brittle material layer having an intentionally created random crack pattern disposed on the substrate layer, and a memory comprising computer readable EMF signature data based on the intentionally created random crack pattern. The EMF signature data can include a seed value or an initialization code where the seed value or initialization code is based on the EMF signature generated when an electrical signal is applied to the substrate layer or the brittle material layer. In various embodiments, the seed values or the initialization codes are suitable for authenticating EMF signature enabled portable consumer devices, such as a credit card and other payment cards, using dynamic password authentication based on the EMF signature.

In some embodiments, the brittle material layer of the portable consumer device can be a conductive or semiconductive material and the substrate layer can be conductive or nonconductive and wherein the EMF signature is a capacitive, inductive or resistive signature of the electrical interaction of the brittle material layer and the substrate layer or an optional protective layer disposed on the brittle material layer.

Other embodiments of the present invention are directed towards methods for making an EMF signature enabled portable consumer device. Such methods can include applying an input signal to a portable consumer device having an intentionally created random crack pattern in a conductive or semiconductive brittle material layer and detecting an EMF signature of the intentionally created random crack pattern and storing data based on the EMF signature in the memory. The random crack patterns can be produced by disposing a brittle material layer on the substrate layer, and striking, breaking or otherwise creating the random crack pattern in the brittle material layer.

Various embodiments include detecting the EMF signature of the random crack pattern in the brittle material layer by applying an electrical signal to the portable consumer device and detecting the electrical interaction between the brittle material layer and the substrate layer or the brittle material layer and a protective layer or a combination thereof. Detecting the electrical interaction can include detecting the variations in the conductive, resistive, inductive or capacitive field at one or more regions of the portable consumer device due to the random crack pattern in the brittle material layer. In other embodiments, detecting the electrical interaction can include detecting a voltage at one or more points of contact on the portable consumer device.

Yet other embodiments of the present invention are directed towards methods of authenticating an EMF signature enabled portable consumer device. Such methods can include receiving the portable consumer device at an access device, applying a signal to the portable consumer device, detecting the EMF signature of the portable consumer device caused by the signal, determining EMF signature data and authenticating the portable consumer device based on the EMF signature data. Applying the signal can include applying an electrical signal through physical electrical contact with one or more regions of the portable consumer device or can include directing electromagnetic energy or an EMF field, wave, or pulse toward the portable consumer device. The electromagnetic energy can be a static electromagnetic field or a time or spatially varied electromagnetic field/wave.

Related embodiments include methods for authenticating an EMF signature enabled portable consumer by calculating a seed value or initialization code from the detected EMF signature and generating a dynamic password or other encrypted data based on the seed value or the initialization code.

BRIEF DESCRIPTION OF THE DRAWINGS

FIG. 1A shows a front view, while FIGS. 1B and 1C show side, cross-sectional views.

DETAILED DESCRIPTION

Figure 1A:
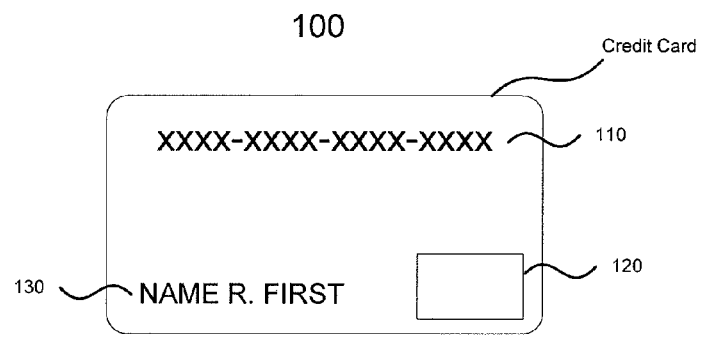
FIGS. 1A, 1B and 1C show conventional payment cards that can be improved by embodiments of the present invention.
Figure 1B:
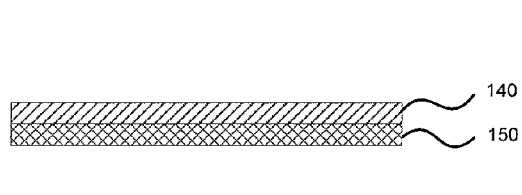
Figure 1C:
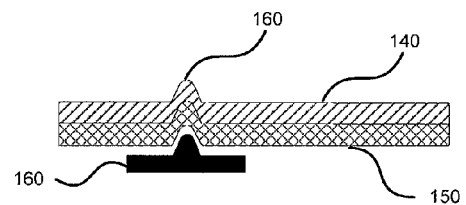
Figure 2A:
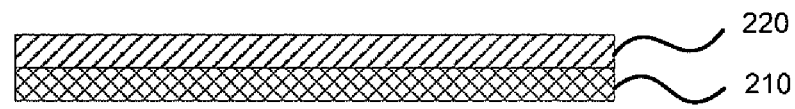
FIGS. 2A, 2B and 2C show side, cross-sectional views of portable consumer devices according to embodiments of the present invention.

FIG. 2A depicts a cross section of a portable consumer device according to an embodiment of the present invention. Portable consumer device 200A includes two layers. In various embodiments, layer 210 is a substrate layer and can be made up of any suitable material including, but not limited to, plastic, resin, metal, or some combination or composite thereof. Substrate 210 can also include conductive or semiconductive materials that can be configured to be electrically coupled to or to otherwise interact with brittle material layer 220 and other possible layers included in the portable consumer device. For many embodiments, it is desirable to choose a material for substrate 210 that balances the rigidity of the material with the ability of the material to be stamped or embossed, such as when credit, debit or gift cards are embossed with account numbers, names and other information. Such embossed features can be achieved by custom or standardized stamps, presses, impact printers, molds or otherwise. In various embodiments, it is desirable for the substrate to not puncture or perforate when stamped or embossed.

In some embodiments, layer 220, in contrast to layer 210, is a brittle material that can break, crack, crease or otherwise become discontinuous when subjected to shearing, stress or strain. In various other embodiments, brittle material layer 220 is stable enough that once it is intentionally broken or cracked to create a unique random crack pattern or fissure pattern during the manufacturing or issuing process, further cracking and breakage stops or is minimal. In some embodiments, brittle material layer 220 can be heat treated, irradiated, chemically set or otherwise annealed or softened to prevent further breakage after the initial intentional cracking. In some embodiments, brittle material layer 220 is resistant to surface scratches and abrasions.

The brittle material layer can also be conductive or semiconductive. In such embodiments, the brittle material layer can be adapted to receive and/or respond to input signals, such as electrical or electromagnetic signals, fields, pulses or waves. The electrical or electromagnetic field (EMF) signature response to the input signals, can be unique based on or due to the intentionally created random crack pattern and can be measured in a variety of manners including, but not limited to, direct contact-based or contactless detection of current, voltage, resistivity, capacity, inductance and EMF field strength, variation or decay, at various points or regions on or around the brittle material layer.

The electrical or EMF signature caused by the specific intentionally created random crack pattern in the conductive or semiconductive brittle material layer, can then be used in various embodiments of the present invention as an encryption key, an encryption seed value, an initialization code or an authentication signature for use in authenticating the portable consumer device or the user presenting the portable consumer device. Using the unique crack pattern to generate the EMF signature can greatly reduce the cost and computational burden associated with implementing various encryption schemes for authenticating portable consumer devices or processing electronic transaction requests. Many unique random crack patterns can easily and cheaply be produced using a standardized process, thus providing a highly scalable and cost effective solution for deploying highly effective and difficult to break encryption based security/authentication systems. Such reduced costs and ease of creating unique signatures are desirable in the deployment of large numbers of portable consumer devices, such as in the deployment of credit and debit cards to geographically remote markets or in the sale of point-of-sale gift cards.

In embodiments that use contact-based detection of the EMF signature or other various electrical or electromagnetic characteristics of the conductive or semiconductive brittle material layer, electrical contact points or pads can be located at various points on and in the portable consumer device, i.e. on the face of a credit card or on the side/edge of a credit card. In addition, various combinations of face and side mounted electrical contact points can be disposed on the portable consumer device so as to be keyed to work with specific credit card readers or access devices. In this way, only specifically designed credit card readers or access devices can input a signal into a particular design of portable consumer device and/or detect the resulting EMF signature. Furthermore, different brands or types of access devices can be configured to use different contact points or input signals and/or detect the response of the portable consumer device at different points of the portable consumer device. In various other embodiments, the portable consumer device can include extraneous or flase electrical contact points to further obfuscate the purpose and the use of the included electrical contact points. For example, a credit card can include extra contact points that if used in an effort to fraudulently determine the electrical or electromagnetic characteristics of the credit card, would produce spurious or inaccurate results.

In other embodiments, the specific input signal or electrical properties of the access device used to apply the input signal to the portable consumer device can also be kept secret to further increase the security and effectiveness of various systems according to various embodiments of the present invention. For example, the access device can have a specifically configured and complementary circuit or electrical signature with which it applies the input signal to portable consumer device. The specific circuits, having specific electrical properties or values, can then influence the resulting EMF signature of the portable consumer device used in the authentication process. In such embodiments, the electrical signature of the access device can then also be tracked in downstream authentication procedures so that the specific identity or location of the access device used to initiate a specific authentication request can be determined.

In embodiments that use contactless detection of the various electrical or electromagnetic characteristics of the conductive or semiconductive brittle material layer, the EMF signature can be detected at various points or regions of the portable consumer device. For example, various near-field and far-field EMF sensors can be positioned over or near specific points or regions of the portable consumer device. In other embodiments, the portable consumer device and EMF sensors can be scanned past one another, i.e. the portable consumer device can be in motion and scanned over a stationary EMF sensor; or the portable consumer device can remain stationary while the EMF sensor is scanned. In some embodiments, the EMF sensor also can also emit an input signal to induce the portable consumer device to generate a unique EMF signature. In such embodiments, the input signal can be constant or varied. In embodiments in which the emitted input signal varies, the variation can be provided by an electronic controller or the relative motion between the portable consumer device and the EMF sensor/emitter. In such embodiments, the variation of the emitted input signal can be a result of the combination of the electronic control and the relative motion of the EMF sensor/emitter.

In various embodiments the brittle material layer 220 is opaque to specific bands of the electromagnetic spectrum. For example, in one embodiment, brittle material layer 220 is opaque to ultra violet light. In yet another embodiment, brittle material layer 220 is opaque to infrared light. When brittle material layer 220 is opaque, the random crack pattern can be detected or imaged by back illuminating the portable consumer device 200A and imaging or otherwise detecting the resulting illuminated random crack pattern. In various embodiments of the present invention, substrate layer 210 is at least partially translucent to whatever band or frequency of the electromagnetic spectrum to which brittle material layer 220 is opaque. The image of the intentionally created random crack or fissure pattern can then be processed to generate a specific electronic signal or signature. In such embodiments, the intensity, duration, or specific bandwidth of the illumination used to image the crack pattern can influence the resulting image, electronic signal or signature.

Figure 2B:
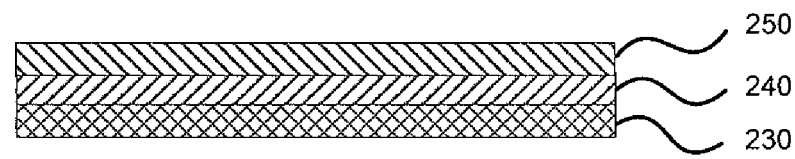

FIG. 2B depicts a portable consumer device 200B according to various embodiments of the present invention. Portable consumer device 200B is similar to the portable consumer device 200A in FIG. 2A, except portable consumer device 200B includes three layers; 230, 240 and 250. In various embodiments, layer 230 is a substrate layer similar to layer 210 described above and can be made of material including, but not limited to, plastic, metal, resin, or an appropriate polymer that can be formulated to have the desired balance of rigidity and malleability. In various embodiments, the balance of rigidity and malleability is achieved when layer 230 can withstand stamping, embossing or bending without breaking, splitting or perforating. Layer 240 is a brittle material that can include, but is not limited to, glass, ceramic, metal or doped silicon.

In various embodiments, brittle material layer 240 can be annealed or softened to prevent breakage once a random crack or fissure pattern is produced in the portable consumer device 200B. The brittle material layer 240 can be made hard enough or soft enough so that after the intentional cracking it can resist or cease further cracking.

In various embodiments, random crack or fissure patterns can be created in brittle material layer 240. Brittle material layer 240 is then annealed or softened before protective layer 250 is applied to portable consumer device 200B. In other embodiments, protective layer 250 is applied to portable consumer device 200B and then brittle material layer 240 is annealed. In yet other embodiments, layers 230, 240 and 250 are joined together and then the random crack or fissure pattern is created in portable consumer device 200B. Once the random crack or fissure pattern is created in the portable consumer device 200B, the entire portable consumer device 200B can be treated such that substrate layer becomes more rigid to protect brittle material layer 240, brittle material layer 240 is annealed, or protective layer 250 is fused to brittle material layer 240 and hardened to prevent further breaking or movement of brittle material layer 240.

In various embodiments, protective layer 250 can conceal at least some of the area of the brittle material layer 240 from view. In various other embodiments, protective layer 250 can be at least partially transparent (e.g. translucent). In yet other embodiments, protective layer 250 is transparent in some regions of the portable consumer device 200B and opaque over other regions of the portable consumer device 200B. In such embodiments, it is possible to see the portions of the random crack or fissure patterns in the regions where protective layer 250 is transparent, whereas the portions of the fissure pattern under concealed regions of the protective layer 250 are hidden from view. In some embodiments, protective layer 250 can be opaque to visible light but translucent or transparent to other bands or frequencies of the electromagnetic spectrum outside of the spectrum visible to humans.

The substrate 230, brittle material layer 240 or protective layer 250 can also include electrical contacts to allow direct contact-based detection of EMF signatures of the conductive or semiconductor brittle material layer 240. In other embodiments, substrate 230 or protective layer 250 can be formulated to have specific electromagnetic properties that will influence the EMF signature of the conductive or semiconductor brittle material layer. For example, protective layer 250 can include various resistive or capacitive materials that can interact with the properties of the conductive or semiconductive brittle material layer 240 to produce a specific EMF signature when an input signal is applied to the portable consumer device. For example, the protective layer can include various conductors and insulators that can be coupled to the brittle material layer and form intentional and unintentional electrical circuits. When the brittle material layer is cracked, the circuits can be randomly created or destroyed to further increase the complexity of the EMF signature to reduce the likelihood that the portable consumer device can be reproduced.

Figure 2C:
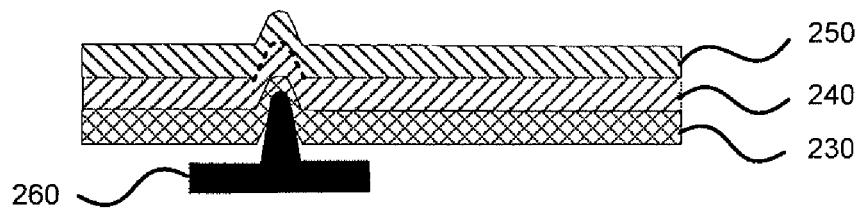

FIG. 2C depicts one method of creating a random fissure or random crack pattern in the brittle material layer 240 according to various embodiments of the present invention. In various embodiments, protective layer 250, brittle material layer 240 and substrate layer 230 are stacked as shown in portable consumer device 200C. In some embodiments, the process starts with forming and cutting a precursor for the substrate layer 230 into the desired size, shape and thickness. In some embodiments, the substrate layer 230 has the same lateral dimensions as a credit or debit card. In various embodiments, the substrate layer 230 is approximately 0.5 mm to 2 mm thick. In such embodiments, the overall thickness of the portable consumer device, including the substrate layer 230, the brittle material layer 240 and the protective layer 250 should be in the range between 0.6 mm to 2.5 mm. Such dimensions can allow credit cards including various embodiments of the present invention to be used with legacy access devices.

In various embodiments, brittle material layer 240 is applied to the substrate layer 230. Application of the brittle material layer 240 to substrate layer 230 can be achieved in numerous ways. In one embodiment, brittle material layer 240 is a sheet of material that can be adhered to the surface of substrate layer 230 (e.g. in a lamination processes). In other embodiments, brittle material layer 240 is applied as a paint, liquid, gel or slurry. In such embodiments, the brittle material layer can be brushed, rolled, printed or sprayed onto the surface of substrate layer 230.

In some embodiments, the paint, liquid, gel or slurry for the brittle material is dried, treated or otherwise hardened before proceeding to the next step. In various embodiments, the drying of brittle material layer 240 causes fissure patterns in brittle material layer 240. For example, a paint or a slurry of a solvent and a pigment can be formulated to result in an unpredictable crack pattern similar to that observed in quickly dried mud or paint or crazed glass. Those skilled in the art will recognize that there are various methods that can be used to create unpredictable and random fissure patterns in the brittle material layer without departing from the spirit or scope of the present invention.

Protective layer 250 can be applied to the exposed surface of brittle material layer 240. In some embodiments, protective layer 250 can be a film and can be applied in sheet form. In various other embodiments, protective layer 250 is applied as a paint, liquid, gel or a slurry. In various embodiments, at least a portion of the protective layer 250 is opaque to visible light. In other embodiments, protective layer 250 is transparent to visible light over all or some of the area of the portable consumer device 200C. In this way, the surface of brittle material layer 240 can be selectively exposed. In various embodiments it is desirable to obscure some or all of the fissure pattern to further thwart potential fraud or counterfeiting. In other embodiments, protective layer 250 can have specific or random electrical properties that be electrically coupled to or interactive with the conductive or semiconductive brittle material layer 240.

As mentioned previously, in some embodiments the brittle material layer 240 can be opaque to various forms of electromagnetic energy. For example, brittle material layer can be opaque to bands of the electromagnetic spectrum in or out of the human visible range. In such embodiments, it is beneficial for the substrate layer 230, the protective layer 250 or both to be more transparent to the particular form of electromagnetic energy to which the brittle material layer 240 is at least partially opaque. In various embodiments, brittle material layer 240 will polarize or reject based on polarization at least a portion of the electromagnetic energy incident on portable consumer device 200B. In various embodiments, it is possible to detect the crack or fissure patterns in brittle material layer 240 by illuminating the portable consumer device with a particular form of electromagnetic energy and detecting the shadows, interference patterns, diffraction patterns, polarization effects or refraction patterns of the fissure pattern in brittle material layer 240. For example, the brittle material layer 240 can be opaque to x-rays while the protective layer 250 and the substrate layer 230 are transparent to x-rays. In this way, an x-ray image of the fissure pattern can be produced with an x-ray emitter and an x-ray detector. Such a process is described in more detail in reference to FIG. 6.

In various embodiments of the present invention, the fissure or random crack pattern is created by a stamp or embosser 260. In various embodiments, the embosser is the same one used to emboss information into the portable consumer device 200C. In various embodiments, when stamp 260 strikes or presses into the substrate layer, it pushes up and deforms substrate layer 230, which in turns cracks or breaks brittle material layer 240 and presses the cracked portion of brittle material layer 240 up and into protective layer 250. The result is an embossed figure, letter, number or symbol. In some embodiments, the fissure patterns 270 are detected or imaged on and around the regions 280 that are embossed. Such stamping or embossing processes can also create unique and random circuits between then brittle material layer and the protective layer to which a signal can be applied to generate or energize a unique electrical or EMF signature.

In some such embodiments, it may be desirable to insert an insulating material layer between the brittle material layer 240 and the protective 250 to prevent electrical contact between the layers unless the layers are stamped or embossed. For example, the point at which embosser 260 presses into the substrate layer 230, brittle material layer 240, the insulating layer (not shown) and protective layer 250, some or all of the layers can create circuits with other parts of the portable consumer device 200C that will provide a specific and unique response when an input signal is applied to the portable consumer device. The interaction of the placement of the embossed sections, the resulting random crack pattern and the electrical properties of the individual material used for the layers can thus create a unique and extremely difficult to recreate circuit. The unique circuit can then be used to generate a EMF signature by which the portable consumer device can be identified or authenticated.

In other embodiments, the brittle material layer 240 and the protective layer 250 can be formed with a standardized or random circuit patterns coupling the two layers, i.e. a resistive, inductive or capacitive network, that can be interrupted and/or broken in random locations across the portable consumer devices when the random crack pattern is created. The resulting randomly created circuit can then be used to generate the EMF signature.

Figure 3:
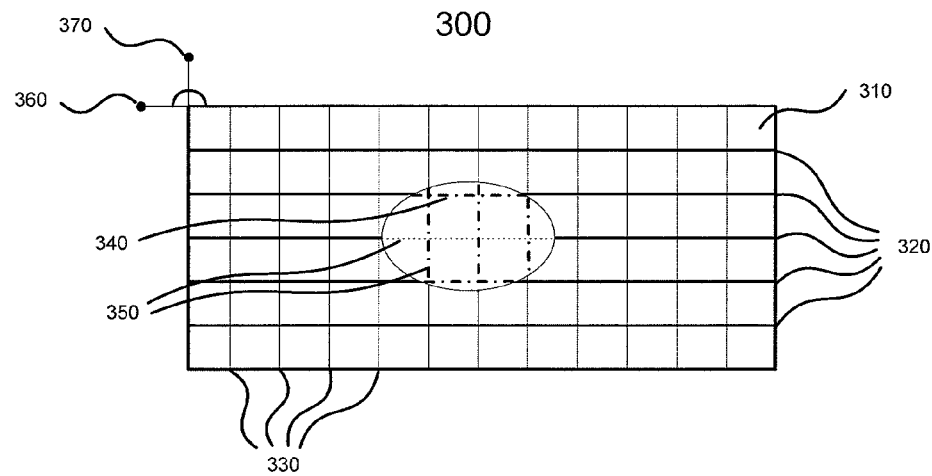
FIG. 3 shows a top view of a layer of brittle material according to an embodiment of the present invention.

FIG. 3 is an overview of a sample region 300 of brittle material layer 240 according to yet another embodiment of the present invention. Sample region 300 is lined with conductors 320 and 330 in a grid pattern. In other embodiments, conductors 320 and 330 can be in some other multi-celled configuration such as a hexagonal grid or triangular grid. In some embodiments, conductors 320 and 330 are electrically coupled. In other embodiments, conductors 320 and 330 are electrically isolated from each other. In various embodiments, the conductors are sandwiched between a substrate layer and protective layer. In various embodiments, conductors 320 and 330 are semiconductors such as doped silicon.

In various other embodiments, the conductors in one direction, such as conductors 320 are couple to a bus 390 that has a lead 370 so that an electrical signal can be applied to conductors 320. Similarly, in various embodiments, conductors 330 are coupled to bus 380 that has a lead 360 so that an electrical signal can be applied to conductors 330. In those embodiments in which conductors 320 are electrically isolated from conductors 330, a separate signal can be applied to lead 360 and lead 370. In some embodiments, the signal applied to lead 320 is different from the signal applied to lead 330.

In various embodiments, lines 350 are cracked or broken when feature 340 is embossed into sample region 300. The dimple in FIG. 3 is just an example of one type of feature 340 that can be embossed into portable consumer device 300. In various other embodiments, sample region 300 can be embossed with any information desired such as account numbers, identification information or names. Each embossed feature can create a unique fissure or breakage pattern in conductors 320 and 330 at points 350. The fissure or breakage patterns at points 350 in embossed feature 340 can be detected by appropriate means.

In various embodiments, the fissure or breakage patterns at points 350 in feature 340 can be imaged using conventional visible light imaging. In various other embodiments, fissure or breakage patterns at points 350 in feature 340 can be detected using conventional non-visible electromagnetic energy imaging. For example, x-ray, ultraviolet, infrared or sound imaging can be used to detect and record fissure or breakage patterns at points 350 in feature 340. One skilled in the art will recognize that other methods of detecting fissure or breakage patterns at points 350 in feature 340 are possible without deviating from the spirit or scope of the present invention.

In various other embodiments, a signature of the electromagnetic field (EMF) can be detected to recognize the fissure or breakage patterns at points 350 in feature 340. By applying an electrical input signal to leads 360, 370 or both, the array of conductors 320 and 330 will have a distinctive EMF signature that can be detected. In various other embodiments, conductors 320 and 330 are electrically coupled and the sample region can be inserted into a calibrated alternating or varied magnetic field to induce a current in each of the remaining closed loops or circuits. In such an embodiment, the current or the induced opposing magnetic field can be measured to detect the EMF signature of the portable consumer device.

Figure 4:
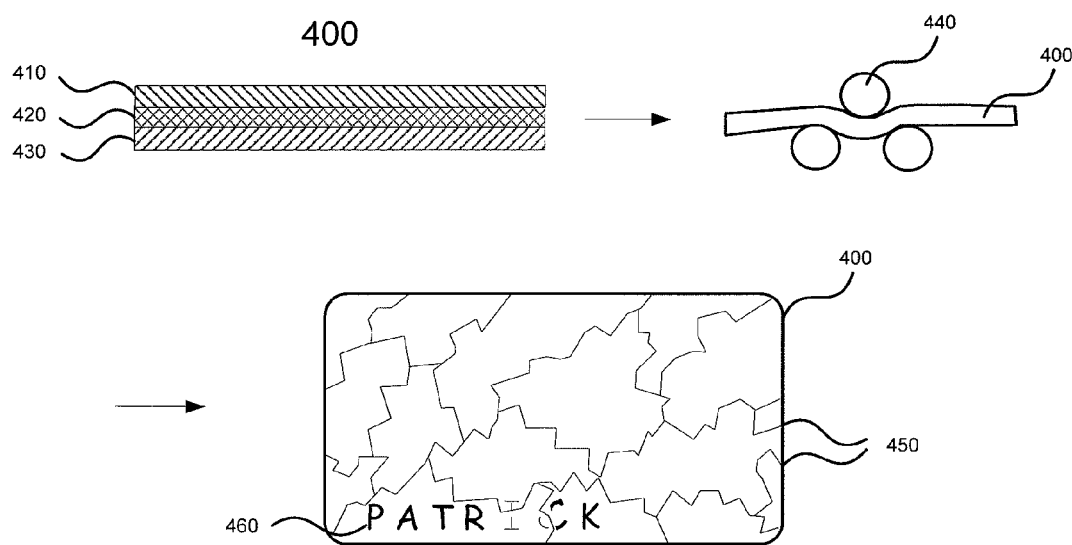
FIG. 4 shows a process for and a result of creating random crack pattern or fissure patterns in a portable consumer device according to an embodiment of the present invention.

FIG. 4 is an illustration of a method to create random crack, fissure or breakage patterns in brittle material layer 420 of portable consumer device 400 according to one embodiment of the present invention. As used herein, the terms crack, fissure and break/breakage can all be used interchangeably to refer to discontinuities that are created or occur naturally in various layers, i.e. a brittle material layer, of portable consumer devices, such as credit cards, according to embodiments of the present invention.

In various embodiments, portable consumer device 400 includes a substrate layer 430, a brittle material layer 420 and a protective layer 410. Portable consumer device 400 is passed through a set of rollers 440 configured to deform portable consumer device 400 to the point where brittle material layer 420 develops fissures or cracks 450. As depicted in FIG. 4, rollers 440 with offset radii are arranged so that portable consumer device 400 is deformed in a serpentine fashion as it is passed through the rollers to create cracks in brittle material layer 420. In other embodiments, cracks can be created by physical, thermal or sonic shock to the surface of portable consumer device 400.

In some embodiments, portable consumer device 400 is struck with a blunt or sharp hammer one or more times to create fissure patterns in the brittle material layer 420. In various other embodiments, the location, direction, amount of force of the blow, and hardness and shape of the hammer is varied from portable consumer device to portable consumer device to further increase the variety and style of fissure patterns created in the brittle material layer 420 of each portable consumer device manufactured.

In various embodiments, the same standardized process to create fissure patterns in the brittle material layer can be used to create a plurality of portable consumer devices each with a unique fissure pattern different from the fissure pattern in any other portable consumer device produced by the standardized process. In such embodiments, the process can include a single device, or many identical devices, that subject a plurality of portable consumer devices to the same stress, strain or shock and because of the material properties of the brittle material, a random crack pattern unique to each portable consumer device will be created.

The standardized process can comprise, but is not limited to, a set of rollers to deform the portable consumer device, a set of hammers or stamps with which to strike the portable consumer devices, a spring loaded sudden stop or other means for applying a physical shock to the portable consumer devices. In various other embodiments, the standardized process can comprise a predetermined thermal shock or sonic shock. Ideally, the nature of the material used for brittle material layer will crack, shatter or craze in unpredictable ways so that each portable consumer device produced will have a unique and irreproducible fissure pattern. One example of the desired type of fissure pattern is the unpredictable cracked, shattered or crazed patterns seen in broken or shattered sheets of glass, porcelain or ceramic. Thus, embodiments of the invention can economically use the same process to create portable consumer devices including different fissure patterns that can be used to authenticate them when they are used to conduct transactions.

In some embodiments, the material used has non-crystalline or anisotropic internal structure. In other embodiments, the material used in brittle material layer 420 has crystalline or isotropic internal structure. A person of ordinary skill in the art will recognize that many types of materials can be used to make brittle material layer 420 without departing from the spirit or scope of the present invention.

In various embodiments, information can be printed on brittle material layer 420 before cracks 450 are created. For example, account numbers, names and other identification information 460 can be printed on the surface of brittle material layer 420 before it is coated with protective layer 410. In such embodiments, figures and text printed on brittle material layer will break in unique ways as shown in FIG. 4 at name 460. As shown, the name "PATRICK" is broken along the "I" and the "C" at locations where the letters intersect cracks or fissures. Information regarding the location and manner in which text or figures are broken can be used, in addition to or as part of the fissure or crack pattern data, to authenticate the portable consumer device 400.

In various embodiments, rollers 440 include three rollers where one roller is opposite the two other rollers such that portable consumer 400 device deforms in at least one direction. In various other embodiments, more than three rollers can be configured to deform portable consumer device 400 in two directions and potentially more than once by running portable consumer device 400 through rollers 440 more than once or in more than one direction. For example, portable consumer device 400 can be run through roller 440 in one direction such as along the long axis of the portable consumer device 400 and then be run through the rollers in the reverse direction. Optionally, portable consumer device 400 can then be reoriented by rotating portable consumer device 400 90° around an axis perpendicular to the surface of the portable consumer device 400 and passed through rollers 440 again. One skilled in the art will recognize that the use of rollers to deform portable consumer device 400 can include many variations of orientations, number of rollers and number of passes without deviating from the spirit or scope of the present invention.

In various embodiments, fissure patterns are created at the point of sale or issuance of each portable consumer device. Such embodiments are particularly useful to prevent fraud in consumer prepaid payment or gift cards. For example, a portable consumer device can be a prepaid gift card. In such embodiments, the fissure patterns can be produced in the brittle material layer in a compact cracking device at the point of sale. For example, the gift card can be deformed to create the fissures in a cracking device located near a cash register or in a kiosk.

In various embodiments of the present invention, the compact cracking device includes rollers. In various other embodiments, the compact cracking device includes a hammer surface against which or with which to strike or shock the gift card to produce fissure patterns in the brittle material layer 420. In various other embodiments, the compact cracking device includes a fissure pattern detection system that can detect and record the unique fissure pattern data of each individual portable consumer device for use later in authenticating that particular portable consumer device when a user tries to redeem it. A fissure pattern detection system is described in more detail below in reference to FIG. 6.

Figure 5A:
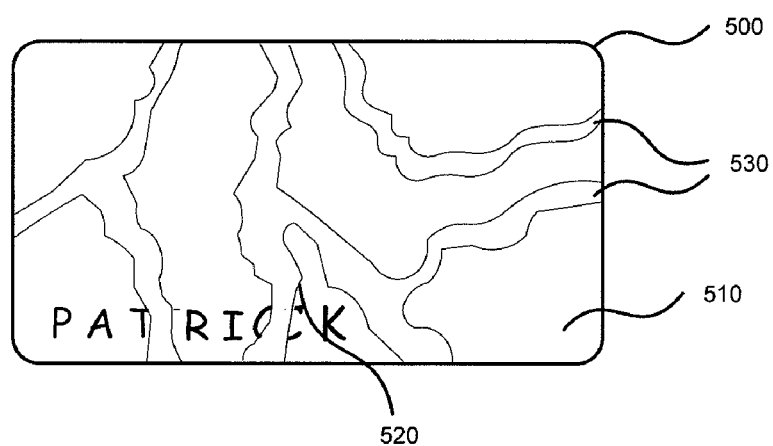
FIG. 5A shows a random crack pattern or fissure pattern on a portable consumer device according to an embodiment of the present invention.
Figure 5B:
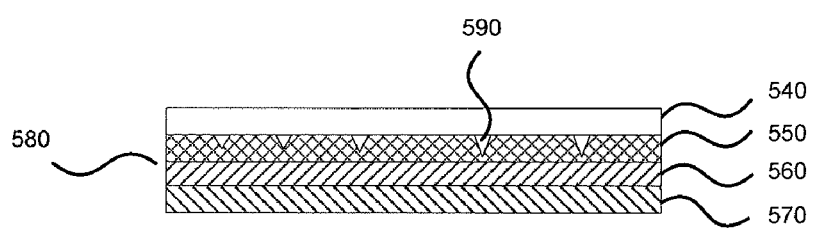
FIG. 5B shows the cross-sectional view of a random crack pattern or fissure pattern in a portable consumer device according to an embodiment of the present invention.

FIGS. 5A and 5B are illustrations of a portable consumer device that uses a slurry comprising one or more solvents and one or more pigments to produce the fissure pattern in portable consumer device 500 according to one embodiment of the present invention. As shown in FIG. 5A, portable consumer device 500 can include four layers; substrate layer 570, barrier or insulator layer 560, brittle material layer 550 and protective layer 540. In other embodiments, portable consumer device 500 can include more or fewer layers. The scale of the layers relative to one another in FIG. 5A, or in any of the other figures discussed herein, should not be considered limiting in any way. One skilled in the art will recognize that various thicknesses of each layer can be used without deviating from the spirit and scope of the present invention.

In one embodiment of the present invention, substrate layer 570 and barrier layer 560 are adhered or otherwise attached to one another. In various embodiments, barrier layer 560 and substrate layer 570 can be the same layer of portable consumer device 500. In some embodiments, barrier layer 560 prevents solvents from penetrating or being absorbed by substrate layer 570. In various embodiments of the present invention, brittle material layer 550 is applied to all or some of the surface of barrier layer 560 in the form of a slurry. In various embodiments, the slurry can be used as a paint to print text, a pattern or a picture such a company name or a logo. In various other embodiments, the slurry is applied to the entire surface of barrier layer 560. The slurry can include an admixture of one or more solvents and one or more pigments. In some embodiments, the evaporation rate or concentration of each solvent used in the slurry can be different so that one solvent evaporates before the others.

In various embodiments, as the slurry dries, the top of the brittle material layer 550, because it is exposed, dries at a faster rate than the bottom of brittle material layer 550. As the solvents evaporate, the slurry dries. As the slurry dries it contracts. Because of the different rates of drying based on depth of the slurry and the types of solvents used, fissures 530 will form at the top of the slurry because the top will contract at a rate faster than the slurry closer to the barrier layer 560. In various embodiments, once the slurry is entirely dry and brittle material layer 550 includes sufficient fissure patterns 530 for use in authenticating the portable consumer device 500, brittle material layer can be treated so that more fissures do not develop after the time of manufacture.

In various embodiments, treating brittle material layer 550 can include applying plasticizers to the brittle material layer 550 to make it supple or flexible. In various other embodiments, treating brittle material layer 550 can include heating, irradiating or cooling the portable consumer device 500 to make brittle material layer softer. In various other embodiments, protective layer 540 is applied to and fused to brittle material layer to immobilize and stabilize the fissure pattern 530.

In various embodiments, brittle material layer 550 is one color and using another color, text or other figures can be printed on the surface of brittle material layer 550 while the top of the slurry is still wet. In such embodiments, the printed text or figures will crack where the top surface of the brittle material layer 550 cracks making unique cuts and breaks into the printed text or figures that can also be used for later authentication when a user presents the portable consumer device 500 to an authentication requestor. In yet other embodiments, random crack or fissure patterns 450 and 590 can be observed or detected at the edge 580 of portable table consumer device 500. In such embodiments, the edge 580 of portable consumer device 500 is presented to a sensor.

Figure 6:
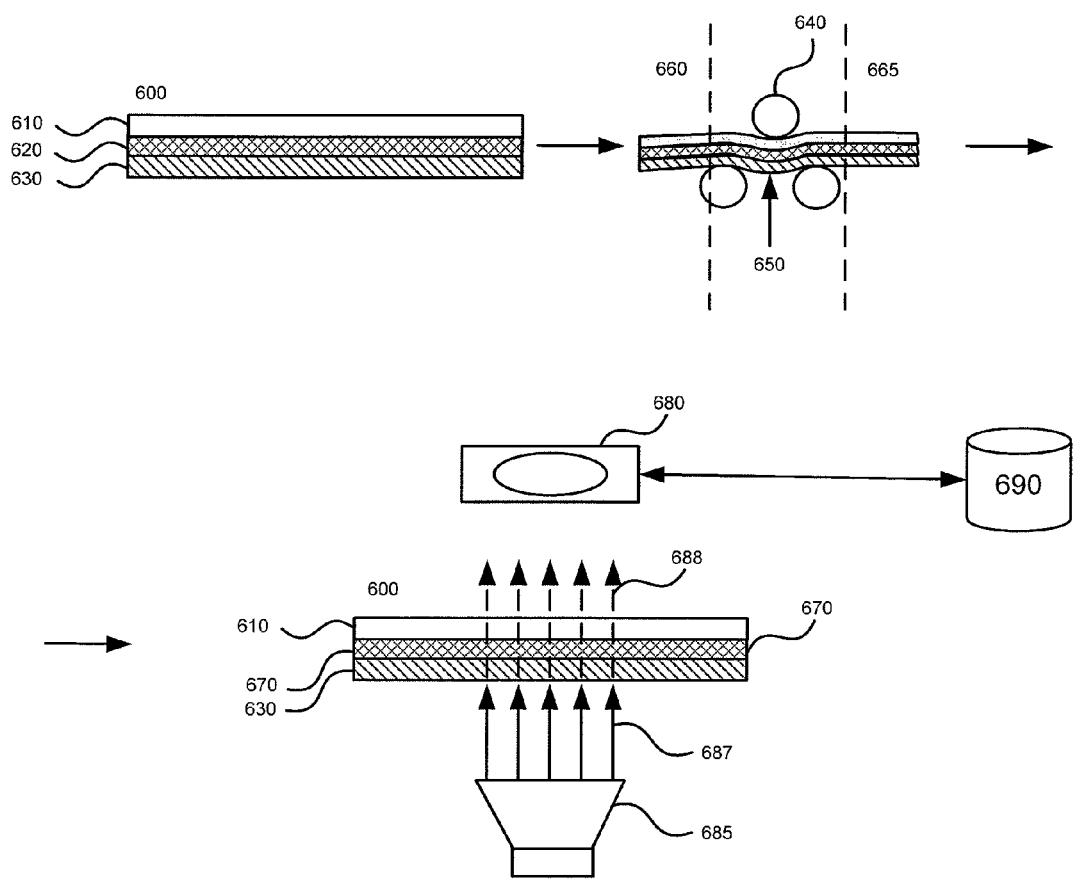
FIG. 6 shows a system which can be used to perform a method for creating and detecting random crack patterns or fissure patterns in a portable consumer device according an embodiment of the present invention.

FIG. 6 is a fissure pattern producing and detection system according to one embodiment of the present invention. A portable consumer device 600 with at least a substrate layer 630, a brittle material layer 620 and protective layer 610 passes through a set of rollers 640 thus deforming portable consumer device at point 650. The deformation of portable consumer device 600 at point 650 is severe enough such that the fissure pattern in brittle material layer 620 in region 665 after the rollers is significantly different from fissure patterns that might have been present in the brittle material layer 620 in the region 660 before the rollers. Once portable consumer device 600 is processed to have a unique fissure pattern, data regarding the unique fissure patterns is detected and recorded by sensor 680.

In various embodiments, source 685 directs electromagnetic energy 687 at the substrate layer 630 side of portable consumer device 600 to back-expose it. Depending on whether the brittle material layer 670 is completely opaque or partially translucent to electromagnetic energy 687, electromagnetic energy 687 is either completely blocked or attenuated in the regions where the brittle material layer is intact. In regions where brittle material layer 670 is cracked, electromagnetic energy 687 passes through portable consumer device 600 and emerges on the other side as attenuated electromagnetic energy 688.

The electromagnetic energy 687 can be a form of electromagnetic energy including, but not limited to, visible light, infrared light, ultraviolet light, polarized electromagnetic energy, x-rays, sonic waves or sonic pulses. Attenuated electromagnetic energy 688 can then be imaged or detected by sensor 680. In various embodiments, sensor 680 includes appropriate filters, receivers, polarizers or lenses to better detect attenuated electromagnetic energy 688. In various embodiments, attenuated electromagnetic energy 688 can be detected as a transmittance profile. In other embodiments, the attenuated electromagnetic energy 688 can be measured as an integrated total transmittance value using an optical integrating device such as an integrating sphere.

In various embodiments, the fissure pattern in portable consumer device 600 is detected or imaged all at once in a single exposure like a photograph. In such embodiments, sensor 680 can be an imaging device such as a digital camera.

In other embodiments, portable consumer device 600 is moved relative to sensor 680 and source 685 to scan the fissure pattern. In such embodiments, sensor 680 can be a scan-head or EMF sensor in proximity to surface of portable consumer device 600.

In various other embodiments, brittle material layer 620 includes material that can be excited by incident electromagnetic energy so as to reemit electromagnetic energy. For example, brittle material layer can contain phosphors or fluorescent materials that are temporarily excited into higher energy states by electrons or ultraviolet light so that they appear to glow in all regions except where the brittle material is cracked. The resulting image of the fissure pattern looks like a dark pattern of cracks on a bright background. In such embodiments, source 685 can be mounted so that electromagnetic energy 687 is incident on the portable consumer device 600 from the same side on which sensor 680 is located.

The image of random crack or fissure pattern or other random crack data detected regarding the random crack pattern in the brittle material layer 670 can be stored in memory 690 (which may be a database). In various embodiments, random crack pattern data can comprise data and information regarding the unique random crack pattern in the brittle material layer 670 including, but not limited to, an image of at least a portion of the random crack pattern, an EMF signature of the random crack pattern, or a transmittance profile of at least a region of the portable consumer device. Memory 690 can be local relative to sensor 680 and source 685 or it can be located at a remote location connected via a network. In yet other embodiments, the system in FIG. 6 does not include the capability to deform portable consumer device 600 such as rollers 640. In such embodiments, the system in FIG. 6 is a random crack pattern detection system that can be used to image or detect the random crack pattern patterns in the brittle material layer 670 or an associated EMF signature when a consumer presents the portable consumer device 600 to an authentication requestor for authentication. For example, a random crack pattern detection system can be included in an access device like a point-of-sale terminal.

Figure 7:
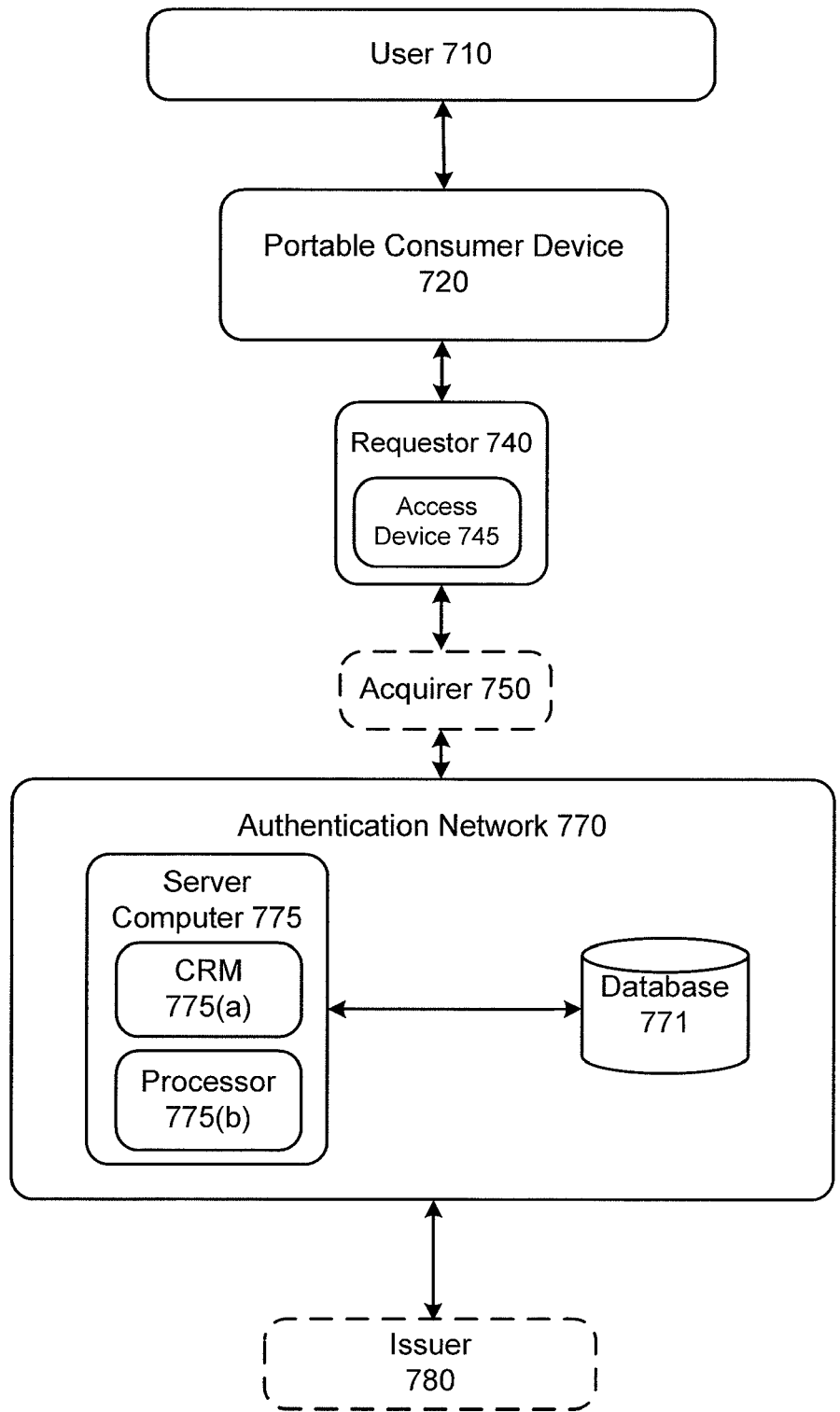
FIG. 7 shows a system for processing, authorizing or authenticating electronic transactions that can be improved by various embodiments of the present invention.

FIG. 7 is a schematic of a system 700 that can implement or be improved by various embodiments of the present invention. System 700 can include user 710, portable consumer device 720, requester 740, acquirer 750 and authentication network 770. In various embodiments, an acquirer 750 and an issuer 780 can also be included in system 700. User 710 can include any individual or entity that is issued a user account associated with portable consumer device 720, such as a consumer or business that has a credit card or debit card payment account. Accordingly, portable consumer device 720 can include any device that can include various aspects of the present invention for creating a unique random crack pattern that can have an associated unique EMF signature. For example, portable consumer device 720 can be a credit card, debit card, a gift card, a cell phone, smart phone or other portable computing device that includes a brittle material layer having intentionally created random crack patterns from which an EMF signature can be detected.

The portable consumer device 720 can be presented to requester 740 to initiate an electronic authorization, authentication or transaction request. In some embodiments, requester 740, such as a merchant, can use an access device 745 to read the EMF signature of the portable consumer device 720 as described herein. The access device 745 can be a card reader, a personal computer, mobile telephone, smart phone or other computing device capable of inducing, generating, reading or detecting the unique EMF signature based on the random crack pattern of the brittle material layer in the portable consumer device 720. For example, access device 745 can include a credit card point-of-sale device that can apply an input signal into a credit card having a brittle material layer using contact or contactless based means. In such embodiments, the portable consumer device 720 can be a passive device that will only reveal the correct EMF signature when a corresponding open standard or proprietary input signal is applied to the portable consumer device.

In some embodiments, the mobile consumer device 720, i.e. a mobile phone or computing device, can include its own power supply with which to generate a unique EMF signature based on the electrical properties of the crack brittle material layer. In such embodiments, when portable consumer device 720 is presented to the access device 745, the power supply and associated control circuitry can apply an appropriate input signal to the brittle material layer in portable consumer device 720. Access device 745 can then detect the EMF signature emitted from the portable consumer device 720. In other embodiments, the power supply and the associate control circuitry can be activated manually by the requester 740 or the user 710 before is presented to the access device 745. In such embodiments, manual activation can include supplying a password to add another layer of security.

Once the EMF signature of portable consumer device 720 is detected or otherwise received by requester 740 and/or access device 745, requester 740 or access device 745 can initiate an authentication request routine. The authentication request routine can include various steps required for initiating, processing or concluding electronic transactions such as credit card payment transactions and other financial transactions.

In some embodiments, the EMF signature can be a topographic map of electromagnetic field strengths across some or all of the surface area of the portable consumer device. For example, the electromagnetic field strengths can be graphed in a one-dimensional, two-dimensional, three-dimensional or four dimensional graph. The graph itself can be used as EMF signature. However in other embodiments the graph of the EMF signature can be processed to generate an encryption key or an encryption seed value that can be sent to a server computer, such as server computer 775 within an authentication network 770, that can then use the encryption key or encryption seed value to encode/decode various information provided by the portable consumer device 720 to process the authentication request.

For example server computer 770, which can include a memory such as computer readable medium (CRM) 775(*a*) and processor 775(*b*), can receive the EMF signature data or file, i.e. in graph, string, scalar or vector form or in the form of an encryption key or seed value. Server computer 775 can then run various software or instructions stored on CRM 775(*a*) to access encryption data and encryption routines stored within database 771 or elsewhere to authenticate the portable consumer device 720.

Server computer 775 and access device 745 can use EMF signature data to initiate or process various forms of dynamic password authentication, cryptographic authentication, zero-knowledge authentication and other types of encryption based protocols. The security, effectiveness, and operational efficiency of such authentication schemes can be greatly increased while lowering the associated cost and computational burdens using various embodiments of the present invention. Server computer 775 can also be used to receive EMF signatures and generate various derivative EMF signature data for use in authenticating an associated portable consumer device. The particular type of transaction can comprise many different types of transactions and the few discussed herein and should be considered exemplary and should in no way be viewed as limiting the present invention.

In various embodiments, the transaction that consumer 710 may want to engage in is a purchase for which he or she seeks authorization to make a payment for the purchase with a consumer payment account (e.g. credit or debit account) associated with the portable consumer device 720. In various other embodiments, the consumer 710 may want access to a controlled access area, such as a secure building or room, and is seeking authorization to enter based on the clearance or permission credentials associated with the portable consumer device 720. In various embodiments, the portable consumer device 720 is an access card that can be carried in the user 710's pocket or wallet or on a lanyard.

In some embodiments, presenting the portable consumer device 720 comprises inserting into or otherwise positioning the portable consumer device 720 on the access device 745 of the requestor 740 so the portable consumer device 720 can communicate with, or the fissure pattern or associated EMF signature can be detected by the access device 745. The access device 745 may comprise components of the fissure detection system shown in FIG. 6.

After the access device 745 receives fissure pattern data and sends it to the to the acquirer 750, and then to the authentication network 770. The random crack pattern or fissure data or detected EMF signature may be embedded in an authorization request message requesting authorization for the transaction. In other embodiments, the access device 745 sends the crack or fissure pattern data and/or the authorization request message directly to authentication network 770.

Embodiments of the present invention for generating unique and random EMF signatures can be used to generate new dynamic passwords. Systems that include portable consumer devices having processors or memories can be used to generate new pass codes each time the portable consumer devices used. The processor in such portable consumer devices can use the unique EMF signature based on the random crack pattern in the brittle material layer as a seed value or initialization code to ensure that no two portable consumer devices have the same password at any given time. It is unlikely that anyone could predict the valid password at any given time without knowing the algorithm, seed value or initialization value. As such using the unique EMF signature greatly increases the security of dynamic password based authentication systems.

In other embodiments, the EMF signature and the associated derivative passwords or codes can be determined each time the card is presented to initiate a transaction so data about or based on the EMF signature does not need to be stored or printed on the portable consumer device. The EMF signature data can be determined each time the portable consumer device is presented to initiate a transaction. Such embodiments improve security by limiting the ability of potential fraudulent users from accessing the EMF signature data on the portable consumer device simply by hacking into or accessing the information stored on the portable consumer device. To obtain the EMF signature or derive any EMF signature based data, a potential fraudulent user would have to know how to induce and detect the EMF signature properly. Limiting the availability of such information and such capability can further increase the security and robustness of the authentication or encryption schemes that use various embodiments of the present invention.

Similarly, embodiments of the present invention can be used to improve security, and operational and deployment efficiencies of symmetric key-based authentication systems, such as digital encryption standard (DES) [4] algorithm or symmetric key cryptography methods used in smart card systems. Such methods use secret cryptographic keys and public DES algorithms stored on portable consumer devices, such as smart cards, or other access devices. Such symmetric key authentication systems can perform various symmetric key authentications.

One exemplary symmetric key authentication system can include a smartcard, having a brittle material layer used to generate a unique EMF signature, that can send the microprocessor serial number to the access device. The access device can then combine the number with the master key to form the smartcards diversified key. In such embodiments, the unique EMF signature or EMF signature-based encryption key or seed value can be loaded into the portable consumer device as the serial number during card initialization or generated each time the portable consumer device is presented to an access device. The access device can then generate a random number which can be encrypted using the received encryption key value. The encrypted random number can then be sent or otherwise transmitted to challenge the portable consumer device. The portable consumer device can then decrypt the encrypted random number forming a response value which can be returned to the access device. The access device then can compare the random number and the response value. If the random number and the response value match, then the transaction authorization request can be accepted.

Similarly, embodiments of the present invention can provide an EMF signature or an EMF signature-based encryption key that can be used in other symmetric key authentication systems, asymmetric key authentication systems as well as zero-knowledge authentication systems. The smartcard-based authentication systems discussed above and other encryption based security/authentication systems can be augmented or improved by using various embodiments of the present invention to increase the cost effectiveness, security, and cryptographic effectiveness of authenticating a portable consumer device or a user.

As shown, system 700 can optionally include sending authentication requests from requester 740 through acquirer 750 as well as report any results provided by authentication network 770 to an issuer 780. In some embodiments, the authentication request from user 710, or portable consumer device 720 can be fully or partially processed by requester 740 or access device 745 with or without the help of authentication network 770. Such embodiments provide the advantage of processing authentication requests in off-line or in less-than-real-time electronic communication with authentication network 770 scenarios.

Figure 8:
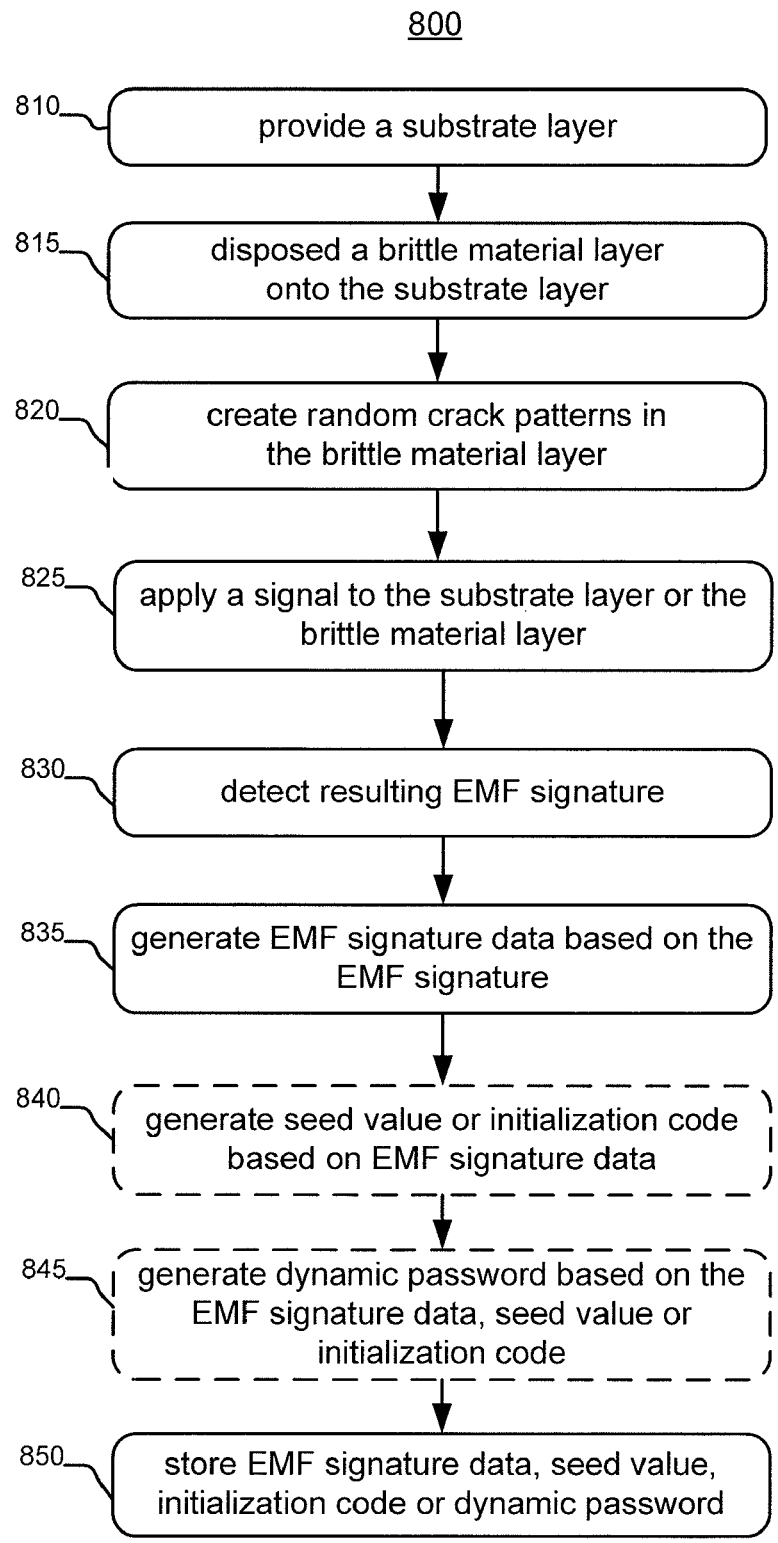
FIG. 8 shows a flowchart of a method for creating an EMF signature enabled consumer device according to various embodiments of the present invention.

FIG. 8 is a flowchart of a method 800 for producing and using a portable consumer device having a brittle material layer according to various embodiments of the present invention. The method begins with providing a substrate layer in step 810. As discussed above, substrate layer can include a number of suitable materials based on the intended use of the resulting portable consumer device. In step 815, a brittle material layer can be disposed on the substrate layer. Random crack patterns are then created in a brittle material in step 820. Once the random crack patterns are generated, as discussed herein, an input signal can be applied to the portable consumer device at the substrate, brittle material layer or other layer. Application of the input signal can be contact or contactless based, i.e. using electrical leads on the portable consumer device or using an induction field emitted by an EMF sensor or EMF emitter, in step 825. In response to the application of the input signal, the portable consumer device can generate a unique EMF signature based on the cracked random pattern in the conductive or semiconductive brittle material layer.

The unique EMF signature generated in response to the input signal can then be detected in step 830. The EMF signature can be detected using contacts-based or contactless means suitable for reliably and consistently detecting the EMF signature of the portable consumer device. For example, an electrical input signal, i.e. a constant or varied electrical voltage or current, can be applied to electrical leads disposed on the portable consumer device. The resulting EMF on and around the portable consumer device can then be detected using near or far afield EMF sensors at various points and surface regions of the portable consumer device. The specific points and regions at which the EMF is detected can influence the specific EMF signature of the portable consumer device. In other embodiments, the portable consumer device can be introduced into a constant or varied electromagnetic field and the resulting induced electrical can be detected at the electrical leads.

Any combination of contact-based or contactless application of input signals and EMF signature detection can be used. In this way, a single portable consumer device having a single unique random crack pattern in the brittle material layer can be used to generate multiple EMF signatures determined by the manner in which the EMF signature is induced and detected. In such embodiments, the same portable consumer device can be used by multiple branded payment or authentication systems, each requesting or requiring a different and unique EMF signature based on open standard or proprietary methods of inducing and detecting the EMF signature of the portable consumer device. For example, one authentication network might require that the EMF signature be induced using a specific contact-based electrical signal while detecting the EMF signature of the portable consumer device, i.e. the credit card, at a specific location and distance from the surface of portable consumer device, i.e. 1 cm away from the surface of the top right quadrant of the credit card, while another authentication network can require that the EMF signature be induced using a specific static or time or spatially varied EMF, i.e. a sine or square wave, but detect the EMF by using the induced electrical signal measured at electrical leads in the brittle material layer.

In related embodiments, the EMF signature can be used to generate specific encrypted or unencrypted EMF signature data that can be stored on a server or on the portable consumer device itself in step 835. EMF signature data can then be used optionally to generate encryption seed values or initialization codes in step 840 for use in various cryptographic encryption schemes used to authenticate portable consumer devices and/or users. In some embodiments, the EMF signature, the EMF signature data, seed values or initialization codes can change over time according to the progressive or continuing breakage of the brittle material layer used to generate the EMF signature.

Such progressive or continuing breakage of the brittle material layer can track the particular usage pattern associated with the owner or authorized user of the portable consumer device and can be used to further increase the complexity and security of authentication systems using portable consumer devices having brittle material layers adapted to produce an EMF signature. In such embodiments, the EMF signature, or other associated or derivative data, can evolve as the brittle material layer continues to crack and create new random crack patterns in the portable consumer device. The evolution of the random crack pattern in a particular portable consumer device associated with a particular user will change according to expected or observed usage patterns. For example, a male user who keeps his credit card in his wallet in his back pocket will produce a different evolving random crack pattern then the female user who keeps her credit card in her purse. The association of the evolution of the random crack pattern can provide an additional layer of security and authentication for the portable consumer device and the associated user.

In some embodiments, the EMF signature data, seed values or initialization codes generated in step 840 can be used to generate dynamic passwords in step 845. Such dynamic passwords can be used in various implementations of dynamic password-based authentication systems, such as smartcard-based dynamic password authentication systems. In many embodiments of the present invention, the EMF signature data, seed values, initialization codes or dynamic passwords can be stored. Depending on the requirements of the specific authentication system implementing various embodiments of the present invention, the EMF signature data, seed values, initialization code or dynamic passwords can be stored on a central server, a local point-of-sale device, a personal computer, a portable computing device or a portable consumer device.

Figure 9:
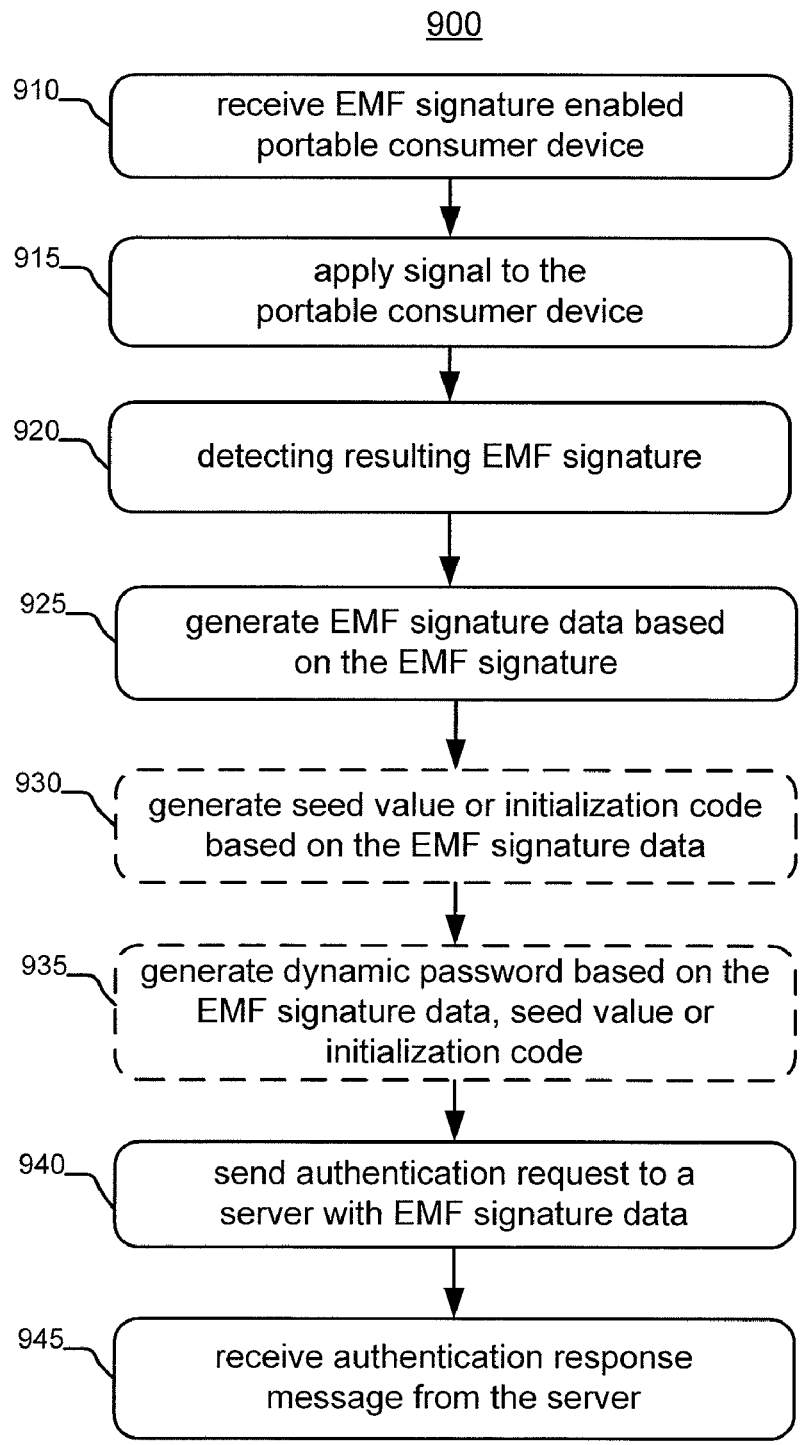
FIG. 9 shows a flowchart of a method for using the EMF signature enabled portable consumer device to authenticate a user.
Figure 10:
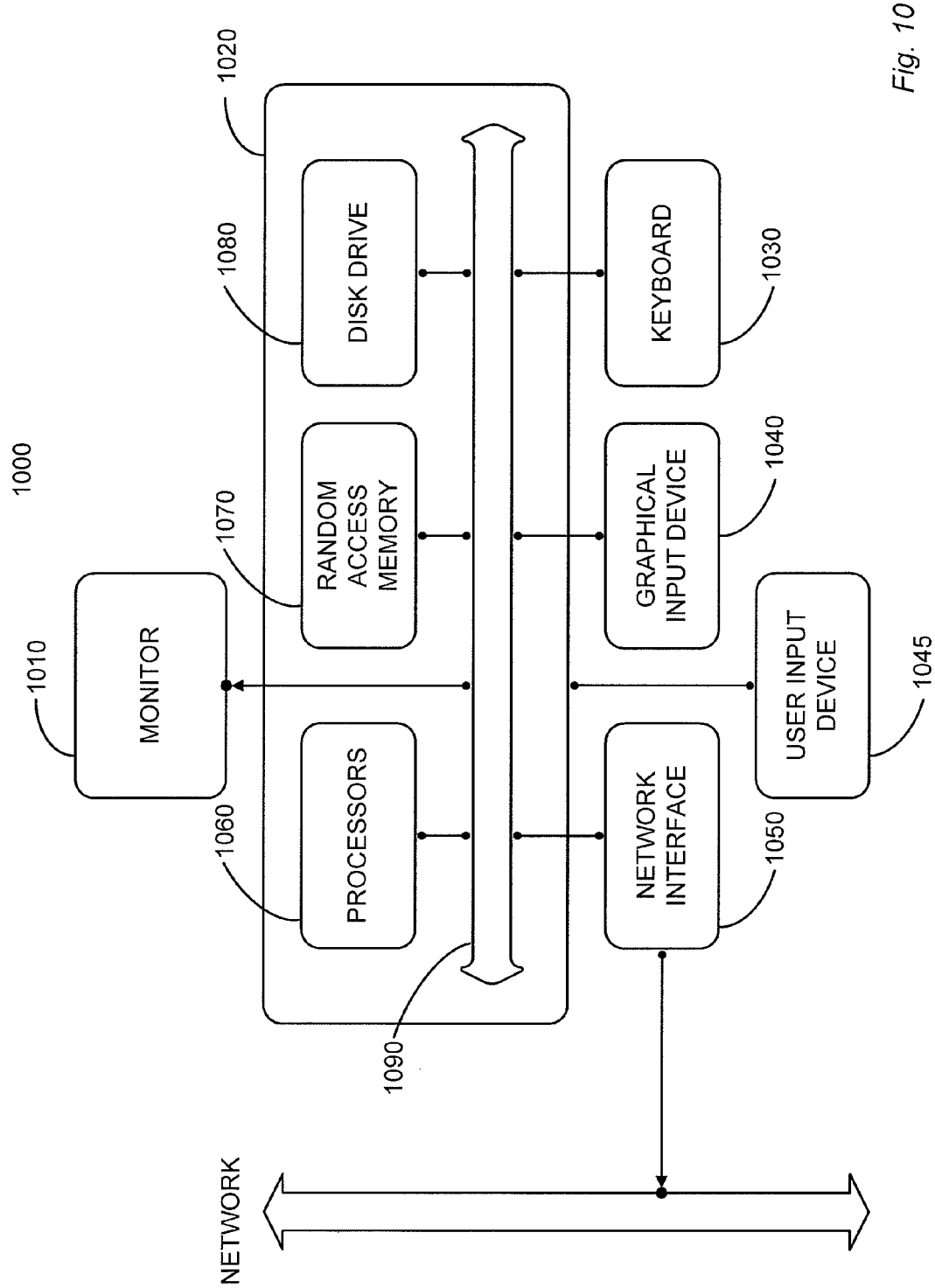
FIG. 10 shows a block diagram of a computer system that can be used to implement various embodiments of the present invention.

FIG. 9 is a flowchart of the method for authenticating a portable consumer device using an EMF signature according to various embodiments the present invention. At step 910, and EMF signature enabled portable consumer device, i.e. a portable consumer device having a conductive or a semiconductive brittle material layer with intentionally created random crack patterns, can be received. The EMF signature enabled portable consumer device can be received by any EMF signature enabled access device, such as a credit card access device, a point-of-sale terminal, a personal computer, a smart phone or other portable computing device. At step 915, EMF signature enabled access device can initiate or apply an contact-based or contactless input signal for the portable consumer device to induce an EMF signature.

In some embodiments, the application of the input signal to the portable consumer device can include an activation or initiation signal to turn on a processor and/or internal power supply included in the portable consumer device itself. The processor and/or the internal power supply can then apply an appropriate open standard or proprietary input signal to one or more of the various layers of the EMF enabled portable consumer device to generate an EMF signature. In other embodiments, the EMF signature enabled portable consumer device can be a passive device having no processor or internal power supply.

In such embodiments, various input signal variable can influence the resulting EMF signature induced in the EMF signature enabled portable consumer device. For example, the manner in which the input signal is applied to the passive EMF signature enabled portable consumer device can induce a unique and random EMF signature specific to that manner of input signal application. Additionally, the specific input signal (i.e. strength or signal shape or content) and the point or region of the portable consumer device to which the input signal is applied can also influence or determine the resulting EMF signature of the EMF enabled portable consumer device. Such embodiments provide the capability of producing different brand, network and transaction specific EMF signatures using the EMF enabled portable consumer device. Each resulting unique EMF signature can then be associated with a particular user account.

Such embodiments can reduce the number of portable consumer devices a user needs to carry while still providing access to multiple user accounts including, but not limited to, credit, debit, checking, savings, access, identification accounts associated with the user. Additionally, a single network or issuer can provide different specific input signals and input signal application requirements, i.e. contact based on certain contact points or contactless based on a particular region of the portable consumer device, for different types of transactions. For example, one issuer may require that a static EMF field at a first specific strength be applied to one half of the portable consumer device for authentication/authorization of payment transactions, while requiring that a second EMF field at a different strength be applied to the other half of the portable consumer device for refunds or other types of financial transactions. In step 920, the resulting EMF signature can be detected by a number of contact-based and contactless detection means.

At step 925, additional EMF signature data can be generated based on the EMF signature. Such derivative EMF signature data, which can include information about, describing or characterizing the EMF signature stored in a variety of data formats suitable for efficient electronic storage and transmission, can be generated at the time of the portable consumer device is deployed or issued, each time the portable consumer device is presented for authentication, or a combination thereof. At step 930 specific derivative EMF signature data, such as seed values or initialization codes, based on other derivative EMF signature data or on the EMF signature itself can be generated. Similarly, in step 935, dynamic passwords and other codes based on the EMF signature data, seed values or initialization codes can also be generated. The EMF signature, derivative EMF signature data, such as encryption seed values or initialization codes, as well as other user or account information can be stored or printed on the portable consumer device and used to authorize/authenticate the portable consumer device or access an associated user account.

Once the requisite EMF signature, EMF signature data, seed values or initialization codes are generated, an authorization request message including various combinations of the detected and derivative EMF signature data can be sent to a server in step 940. In response to the authentication/authentication request message, the requesting entity, such as a merchant or user, can receive an authentication/authorization response message in step 945. The authentication/authorization response message can include an indication whether the provided EMF signature or other derivative EMF signature data provided in the authentication request is acceptable for authenticating the EMF signature enabled portable consumer device.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

System 1000 is representative of a computer system capable of implementing various embodiments of the present invention. The computer system can be present in any of the elements described here, including access device 745 and server computer 775 described above. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Xeon™, Pentium™ or Core™ microprocessors; Turion™ 64, Opteron™ or Athlon™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board. Various embodiments may be based upon systems provided by daVinci, Pandora, Silicon Color, or other vendors.

In one embodiment, computer system 1000 typically includes a display 1010, computer 1020, a keyboard 1030, a user input device 1045, network interface 1050, and the like. In various embodiments, display (monitor) 1010 may be embodied as a CRT display, an LCD display, a plasma display, a direct-projection or rear-projection DLP, a microdisplay, or the like. In various embodiments, display 1010 may be used to display user interfaces and rendered images.

In various embodiments, graphical input device 1040 is typically embodied as a computer mouse, a trackball, a track pad, a joystick, wireless remote, drawing tablet, voice command system, and the like. Graphical input device 1040 typically allows a user to select objects, icons, text and the like that appear on the display 1010 via a command such as a click of a button or the like. An additional specialized user input device 1045, such a magnetic stripe, RFID transceiver, smart card reader or other EMF signature enabled reader/access device can also be provided in various embodiments. In other embodiments, user input device 1045 include additional computer system displays (e.g. multiple monitors). Further user input device 1045 may be implemented as one or more graphical user interfaces on such a display.

Embodiments of network interface 1050 typically include an Ethernet card, a modem (telephone, satellite, cable, ISDN), (asynchronous) digital subscriber line (DSL) unit, FireWire interface, USB interface, and the like. For example, network interface 1050 may be coupled to a computer network, to a FireWire bus, or the like. In other embodiments, network interface 1050 may be physically integrated on the motherboard of computer 1020, may be a software program, such as soft DSL, or the like.

RAM 1070 and disk drive 1080 are examples of computer-readable tangible media configured to store data such user, account and transaction level data, calculated aggregated data, super keys, sub keys and other executable computer code, human readable code, or the like. Other types of tangible media include magnetic storage media such as floppy disks, networked hard disks, or removable hard disks; optical storage media such as CD-ROMS, DVDs, holographic memories, or bar codes; semiconductor media such as flash memories, read-only-memories (ROMS); battery-backed volatile memories; networked storage devices, and the like.

In the present embodiment, computer system 1000 may also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer 1020 typically includes familiar computer components such as a processor 1060, and memory storage devices, such as a random access memory (RAM) 1070, disk drives 1080, and system bus 1090 interconnecting the above components.

In some embodiments, computer 1020 includes one or more Xeon microprocessors from Intel. Further, in the present embodiment, computer 1020 typically includes a UNIX-based operating system.

It should be understood that embodiments of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A system comprising:
    a portable consumer device comprising:
    a substrate layer;
    a brittle material layer having an intentionally created random crack pattern disposed on the substrate layer; and
    a memory comprising computer readable electromagnetic field (EMF) signature data based on the intentionally created random crack pattern.

2. The system of claim 1 wherein the EMF signature data comprises a seed value or an initialization code.

3. The system of claim 2 wherein the seed value or initialization code is based on the EMF signature generated by the application of a signal to the substrate layer or the brittle material layer.

4. The system of claim 3 wherein the seed value or the initialization code is suitable for authenticating the EMF signature enabled portable consumer device using dynamic password authentication.

5. The system of claim 4 wherein the brittle material layer is a conductive or semiconductive material and the substrate layer is nonconductive and wherein the EMF signature is a capacitive, inductive or resistive signature of the electrical interaction of the brittle material layer and the substrate layer.

6. A method for making an electromagnetic field (EMF) signature enabled portable consumer device comprising:
applying a signal to a portable consumer device having an intentionally created random crack pattern;
detecting an EMF signature of the intentionally created random crack pattern; and
storing data based on the EMF signature in the memory.

7. The method of claim 6 further comprising providing a substrate layer, disposing a brittle material layer on the substrate layer, and creating the random crack pattern in the brittle material layer.

8. The method of claim 6 wherein detecting the EMF signature of the random crack pattern in brittle material layer comprises applying an electrical signal to the portable consumer device and detecting the electrical interaction between the brittle material layer and the substrate layer.

9. The method of claim 8 wherein detecting the electrical interaction comprises detecting the variations in a conductive, resistive, inductive or capacitive field at one or more regions of the portable consumer device due to the random crack pattern in the brittle material layer.

10. The method of claim 8 wherein detecting the electrical interaction comprises detecting a voltage at one or more points of contact on the portable consumer device.

11. The method of claim 6 wherein storing the data based on the EMF signature in the memory comprises generating a seed value or an initialization code based on the EMF signature.

12. A method of authenticating a electromagnetic field (EMF) signature enabled portable consumer device comprising:
receiving the portable consumer device at an access device;
applying a signal to the portable consumer device;
detecting the EMF signature of the portable consumer device caused by the signal;
determining EMF signature data; and
authenticating the portable consumer device based on the EMF signature data.

13. The method of claim 12 wherein applying the signal comprises applying an electrical signal through physical electrical contact with one or more regions of the portable consumer device.

14. The method of claim 12 wherein applying the signal comprises directing electromagnetic energy toward the portable consumer device.

15. The method of claim 14 wherein the electromagnetic energy comprises an time or spatially varied electromagnetic wave.

16. The method of claim 14 wherein the electromagnetic energy comprises a static electromagnetic field.

17. The method of claim 12 determining the EMF signature data comprises calculating a seed value or initialization code from the detected EMF signature.

18. The method of claim 17 further comprising generating a dynamic password based on the seed value or the initialization code.

19. The method of claim 18 wherein authenticating the portable consumer device comprises sending an authentication request message including the dynamic password to a server and receiving an authentication response message from the server.

* * * * *